(No Model.)  6 Sheets—Sheet 1.

J. N. SEVERANCE.
LATHE ATTACHMENT FOR MAKING METAL SCREWS.

No. 413,870. Patented Oct. 29, 1889.

Fig. 1

WITNESSES:

INVENTOR:
J. N. Severance

BY
Munn & Co.
ATTORNEYS.

(No Model.) 6 Sheets—Sheet 3.

J. N. SEVERANCE.
LATHE ATTACHMENT FOR MAKING METAL SCREWS.

No. 413,870. Patented Oct. 29, 1889.

WITNESSES:

INVENTOR:
J. N. Severance
BY Munn & Co.
ATTORNEYS.

(No Model.) 6 Sheets—Sheet 4.
J. N. SEVERANCE.
LATHE ATTACHMENT FOR MAKING METAL SCREWS.
No. 413,870. Patented Oct. 29, 1889.
*Fig. 5.*
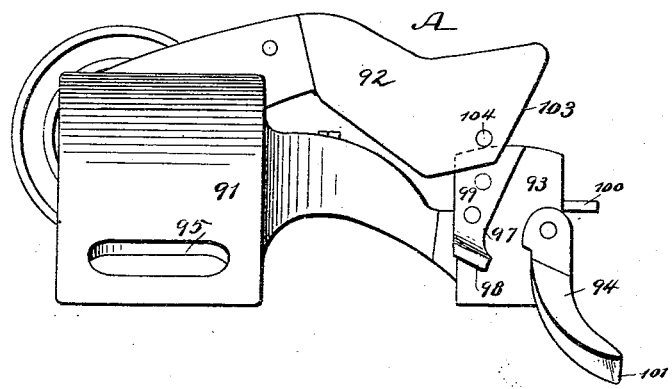
*Fig. 7.*
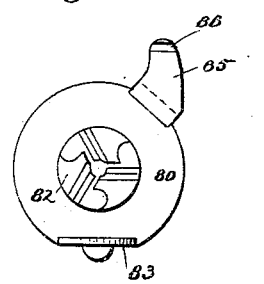
*Fig. 6.*
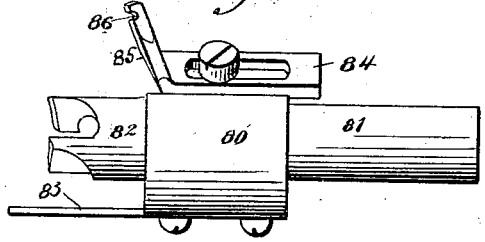
*Fig. 7.*
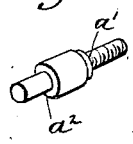
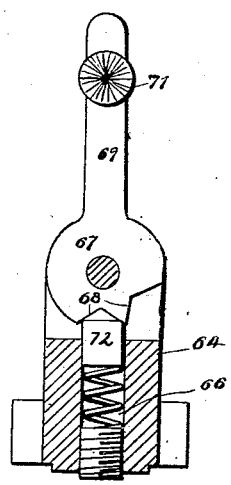
WITNESSES.
John M. Deemer
C. Sedgwick
INVENTOR:
J. N. Severance
BY
Munn & Co.
ATTORNEYS.

(No Model.) 6 Sheets—Sheet 5.

J. N. SEVERANCE.
LATHE ATTACHMENT FOR MAKING METAL SCREWS.

No. 413,870. Patented Oct. 29, 1889.

WITNESSES:

INVENTOR:
J. N. Severance
BY
Munn &Co
ATTORNEYS.

(No Model.) 6 Sheets—Sheet 6.
J. N. SEVERANCE.
LATHE ATTACHMENT FOR MAKING METAL SCREWS.
No. 413,870. Patented Oct. 29, 1889.
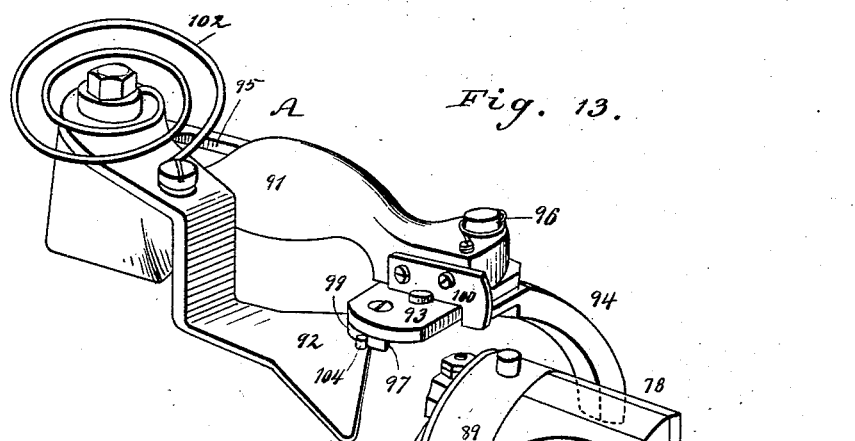
Fig. 13.
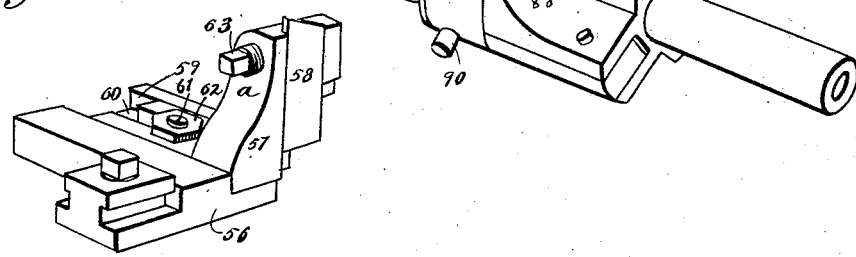
Fig. 14.
Fig. 12.
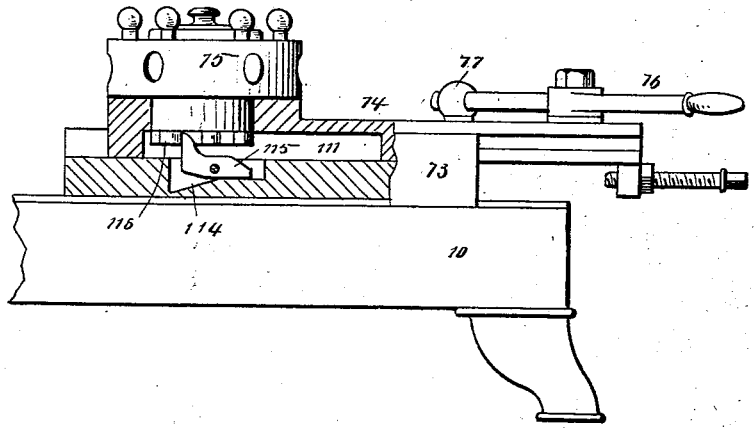
WITNESSES:
John M. Deemer
C. Sedgwick
INVENTOR:
J. N. Severance
BY
Munn & Co.
ATTORNEYS.

UNITED STATES PATENT OFFICE.

JOHN N. SEVERANCE, OF READVILLE, ASSIGNOR TO THE LECKIE BUTTON AND MANUFACTURING COMPANY, OF BOSTON, MASSACHUSETTS.

LATHE ATTACHMENT FOR MAKING METAL SCREWS.

SPECIFICATION forming part of Letters Patent No. 413,870, dated October 29, 1889.

Application filed May 16, 1889. Serial No. 311,084. (No model.)

*To all whom it may concern:*

Be it known that I, JOHN N. SEVERANCE, of Readville, in the county of Norfolk and State of Massachusetts, have invented a new and Improved Machine for Threading, Reducing, and Cutting Wire, of which the following is a full, clear, and exact description.

My invention relates to an improvement in machines for threading, reducing, and cutting wire, and especially to a machine capable of use in the manufacture of button-shanks.

The object of the invention is to provide a machine of simple, durable, and economical construction, by which the shanks above referred to may be expeditiously, accurately, conveniently, and continuously constructed from a length of suitable wire.

The invention consists in the novel construction and combination of the several parts, as will be hereinafter more fully described, and pointed out in the claims.

Reference is to be had to the accompanying drawings, forming a part of this specification, in which similar figures and letters of reference indicate corresponding parts in all the views.

Figure 2:
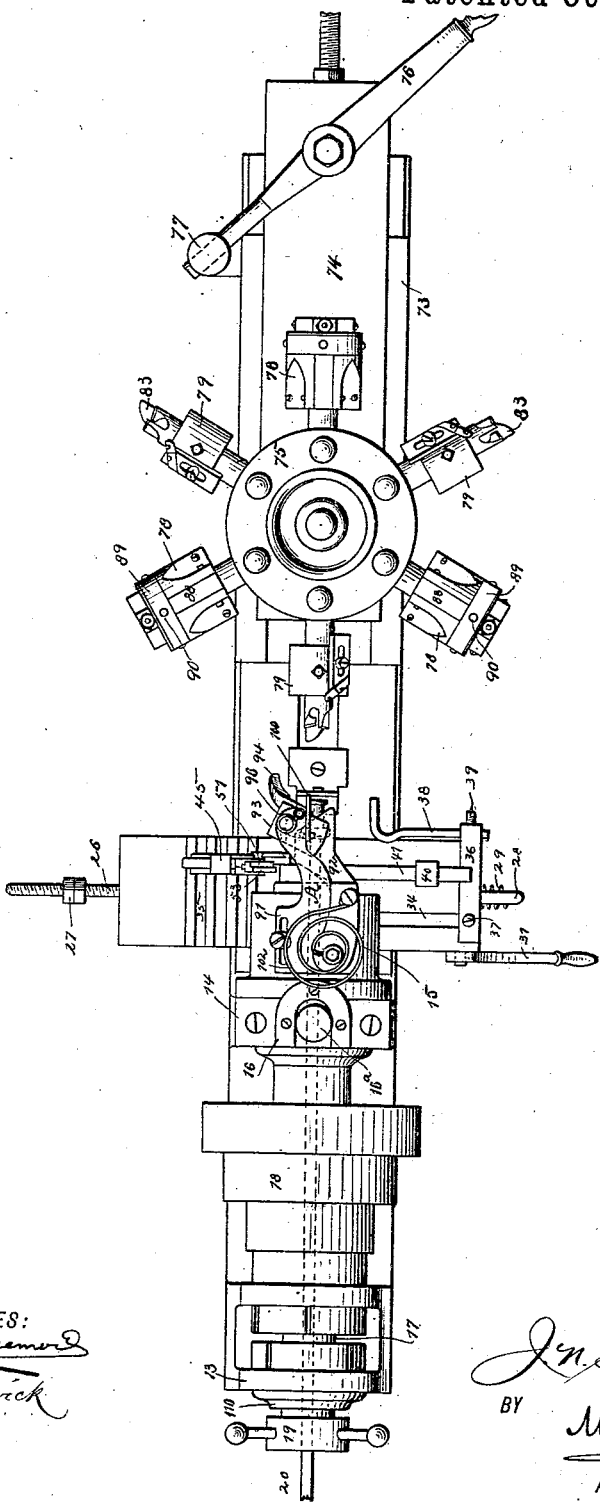
Figure 3:
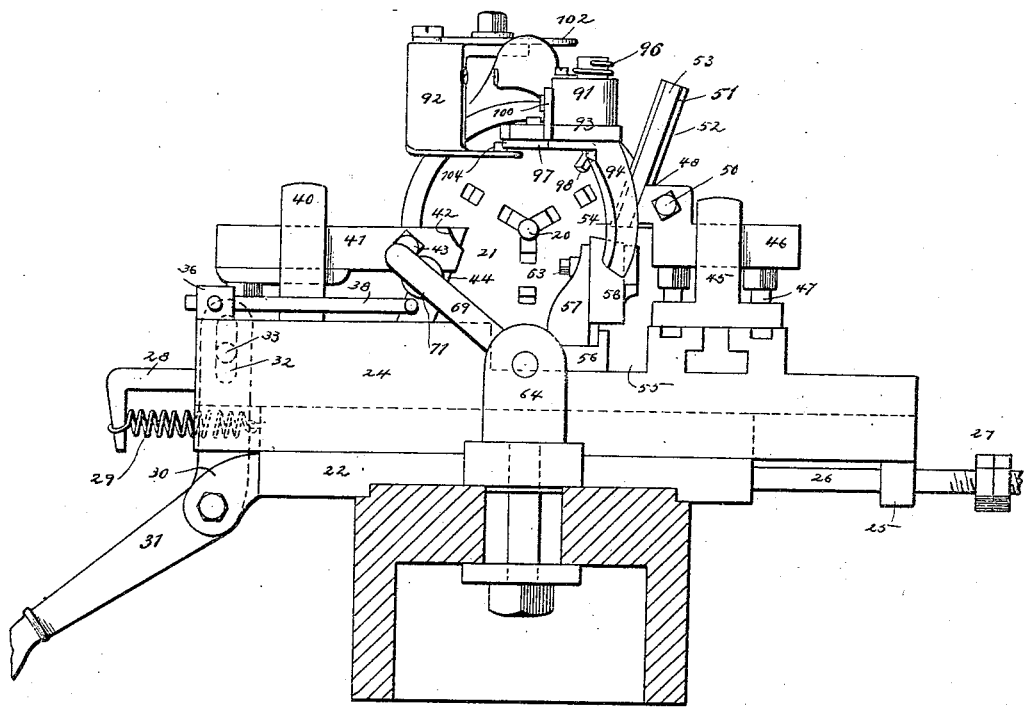
Figure 4:
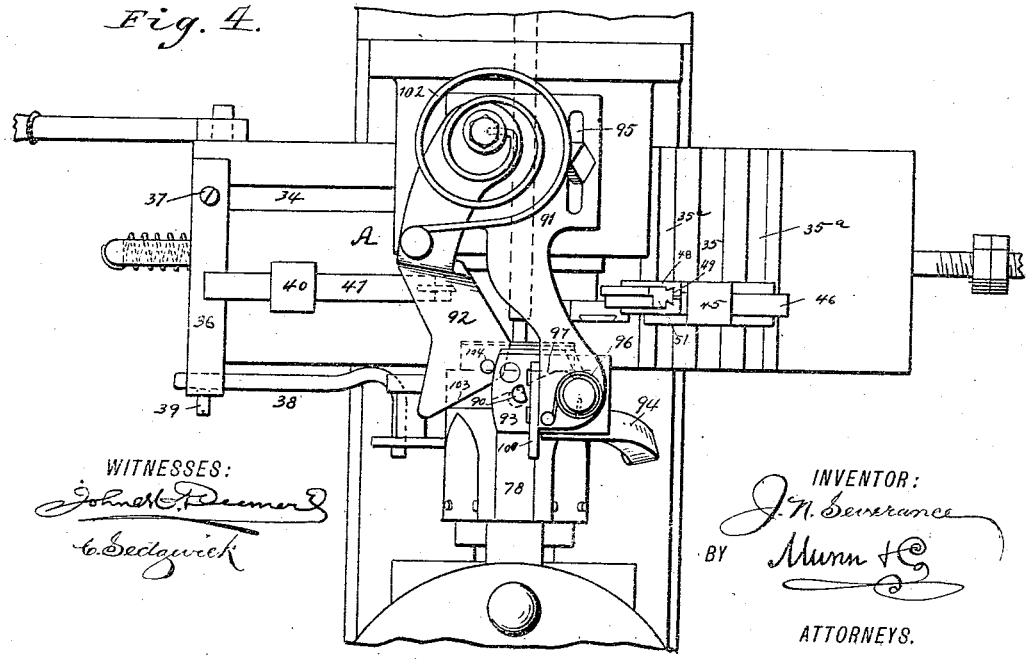
Figure 10:
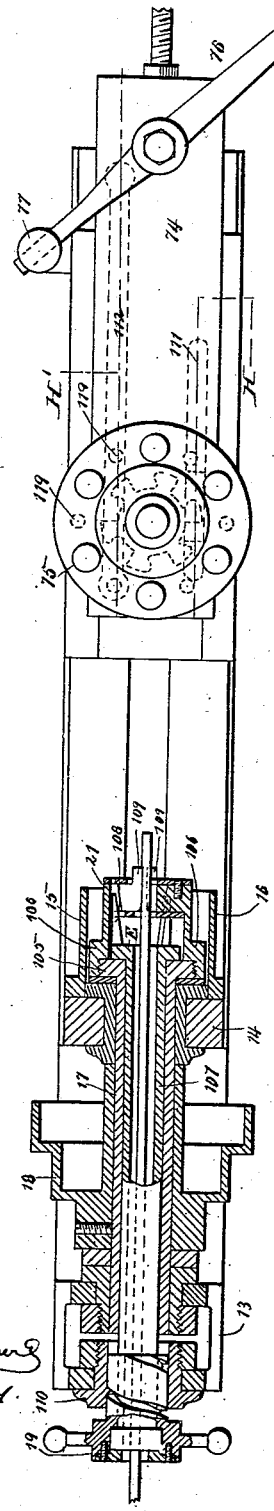
Figure 11:
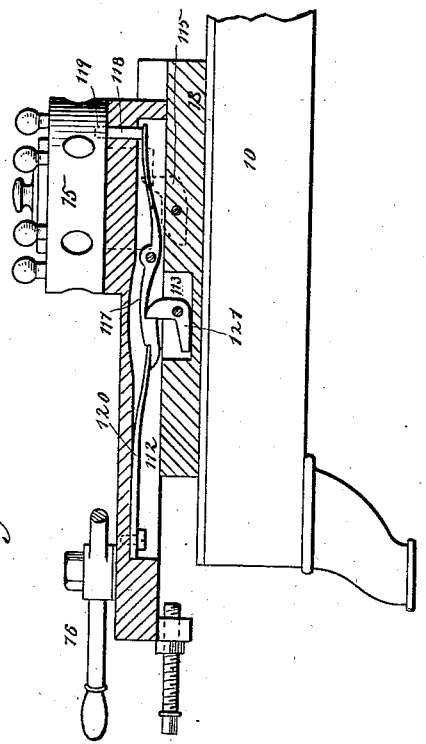

Figure 1 is a side elevation of the machine. Fig. 2 is a plan view thereof. Fig. 3 is a transverse section on line $x$ $x$ of Fig. 1. Fig. 4 is an enlarged plan view of the transverse sliding carriage and the die-operating mechanism. Fig. 5 is a bottom plan view of the die-operating mechanism. Fig. 6 is a side elevation of the reamer and attached tripping mechanism. Fig. 7 is a front elevation of the same. Fig. 8 is a front elevation of the rod finishing or smoothing device. Fig. 9 is a perspective view of the finished shank. Fig. 10 is a plan view of the machine, the mechanism at one end being in horizontal section. Fig. 11 is a vertical section taken through the turret-table at one side of the turret. Fig. 12 is a similar view, the section being taken through the table at the opposite side of the turret.
Fig. 13 is a perspective view of the die-operating mechanism and also a perspective view of a die-head represented in position to be operated upon, and Fig. 14 is a perspective view of one of the cutters.

In carrying out the invention I employ the major portion of what is known as the "Brown and Sharp screw-cutting machine," in which, by reference to Figs. 1 and 2 of the drawings, it will be observed that a bed 10 is supported upon suitable legs 11, attached to a supporting-table 12. From one end of the bed a standard 13 is vertically projected, having a bifurcated upper end, and in advance of the bifurcated standard 13, at one side of the center of the bed, a second perpendicular standard 14 is formed integral with the bed or attached thereto. Upon the face of the latter standard 14, approaching the center of the bed, a hollow cylinder or jacket 15 is horizontally supported, being usually attached at the top by an essentially horseshoe-shaped clamp 16, which is made in this form to permit the upward passage of an adjusting-screw 16ª from the standard, as best shown in Figs. 1 and 2.

In the standards 13 and 14 a hollow shaft 17 is journaled, provided between the same with a cone-pulley 18 and at its outer end with a spoked clamping-ring 19, adapted for the manipulation of a chuck, hereinafter referred to. A wire rod 20, upon which the thread is to be cut, is first passed through the shaft 17 and then through a suitable form of chuck 21, secured to the inner end of the said shaft within the cylinder 15, the jaws of which chuck are opened and closed by the ring 19.

I do not confine myself to any specific construction of the parts above described, as any device for feeding a wire rod through a hollow shaft at intervals may be employed. Likewise any form of chuck may be employed for rigidly holding one end of said rod, the jaws of which chuck may be opened and closed in any approved manner.

A plate 22 is rigidly secured transversely to the bed 10 in front of the standard 14 and partially below the chuck cylinder or casing 15, which plate projects beyond each side of the bed, as best shown in Fig. 3. The upper surface of the plate is provided with a preferably dovetail lengthwise rib 23, and a bed-block 24 is held to slide upon the plate 22, having to that end a dovetail slot capable of receiving the rib 23, as shown in Fig. 1. The bed-block 24 is of greater length than the fixed plate 22, and at one end, upon its under face, an apertured lug 25 is secured, through which lug a horizontal rod 26 passes, secured at one extremity to the plate and provided at its other extremity beyond the lug with an adjustable stop 27, consisting, usually, of a nut or nuts, as best illustrated in Fig. 3. From the opposite end of the sliding bed-block a hook or stud 28 is projected, to which one end of a coil or spiral spring 29 is secured, the other end of the spring being firmly attached to the corresponding extremity of the plate 22. An extension 30 is formed upon the end of the plate carrying the spring 29 at its outer side, as best shown in Fig. 1, to which an elbow or bell-crank lever 31 is pivoted, the vertical member whereof is provided with a slot 32, capable of receiving a pin 33, secured in the outer side of the plate 24, as shown in Figs. 1 and 3.

In manipulating the bed-block 24 the handle of the lever 31 is raised or lowered, carrying said block to the right or left. The spring 29, when the lever is released, returns the bed-block to its normal position, (shown in Fig. 3,) the movement in one direction being limited by the adjustable stop 27, and in the other direction by contact of the lug 25 with the plate 22. At the left, upon the upper face of the bed-block 24, parallel T-grooves 34 are produced, extending from its end nearly to its center, and in its upper face, near its other end, similar transverse grooves 35 are cut, as shown in Figs. 2 and 4, having a plain groove 35$^a$ at each side. In the grooves 34 at the extreme left of the bed-block a bar 36 is adjustably held, provided with T-lugs upon its under face adapted to enter said grooves, a set-screw 37 near one end, whereby the bar is held in a fixed position, and an arm 38, adjustably held in its inner end, which end projects preferably along the block 24. The said arm 38 extends inward horizontally over the bed 10 of the machine at a right angle to the bar 36, and the free end of the arm at the left of the center of the bed-block 24 is bent at an angle away from said bed-block longitudinally of the fixed bed 10, as best shown in Figs. 2 and 4. The arm is adjustably held in the bar 36 by a set-screw 39.

In the inner groove 34 of the sliding bed-block a vertical post 40 is inserted, slotted to receive a knife-clamp 41, passed horizontally through the same and keyed in position in any well-known manner. The inner end of the clamp is made in two sections having a concave recess 42 in their upper edge and secured together by a set-screw 43, as best shown in Fig. 3. Between the sections of the clamp a knife 44 is rigidly held in such manner that the upper portion of the cutting-edge will only be exposed by the said recess 42, the body of the knife extending below the clamp at an inclination outward.

In the central transverse groove 35 of the bed-block 24 an inverted-T-shaped standard 45 is held to slide, transversely slotted to receive an essentially L-shaped clamp 46, the horizontal member of which is passed through the slot of the standard and held rigidly in position by two adjusting-screws 47, one at each side of the vertical portion of the standard, as best shown in Fig. 3, the lower or projecting ends of which screws extend down in the side transverse grooves 35$^a$ of the bed-block, whereby the standard may be adjusted upon said bed-block as desired. The vertical member of the knife-clamp 46 is provided with a right-angular extension 48 at its upper end, having an upwardly-inclined end face, in which face a dovetail groove 49 is produced. The vertical member of the L-clamp and the extension 48 are split from top to bottom and sprung together by a binding-screw 50, as shown in Fig. 3. The knife 51, carried by the L-shaped clamp, is provided upon its back with a dovetail rib 52, and upon its front at one edge a longitudinal shoulder 53 is formed. The lower end of the knife is beveled to produce a sharp cutting-edge 54, whereby when the cutting-edge is brought in contact with the wire rod the surface of the rod will be reduced the width of the shoulder.

In placing the knife in position in the clamp the rib is introduced into the groove 49 of the extension 48 and carried downward until the cutting-edge is flush with the lower face of the extension, and the adjusting-screw is then manipulated to bind the knife in place. It will be observed that by reason of the inclined face of the extension the knife when set is given an upward and outward inclination, as shown in Fig. 3.

At or near the center of the bed-block 24, which for convenience hereinafter may be called the "knife-carriage," a transverse recess 55 is formed, adapted to receive a knife-block 56, (illustrated in detail in Fig. 14,) which block is secured to the knife-carriage in any approved manner, and is adapted to support a sliding clamp 57, carrying a perpendicular knife 58. The knife-block is provided with a channel 59 near one edge, parallel with the ends of the knife-carriage, in which channel the horizontal member of the clamp 57 is loosely fitted, said clamp being essentially in the form of a right angle. The horizontal member of the clamp is provided with a slot 60, and is held in adjustable position by a set-screw 61 passing through a washer 62 and the slot 60 into the block. The vertical member of the clamp is preferably curved, as shown at $a$, Fig. 14, to incline outward from the center of the carriage 24 over the side of the knife-block. The upper end of the clamp 57 is cut vertically to form opposed jaws drawn together by an adjusting-screw 63, and in the inner face of the said vertical member of the clamp, principally in the overhanging portion, a vertical recess is produced capable of receiving the knife 58. The upper or cutting edge of the knife is beveled outwardly and downwardly.

In adjusting the knives 51 and 58 upon the carriage the knife 58 is located nearer the center of the carriage and closer to its inner side edge, as best shown in Figs. 2 and 4.

In the center of the bed 10 of the machine a post 64 is bolted or otherwise secured to project vertically upward, as illustrated in Figs. 1 and 3. The post is provided with a slot 65 in its upper end, extending transversely of the said bed 10, and a vertical bore 66, leading into said slot, as shown in Fig. 8. Within the slot 65 a disk 67 is pivoted, provided with two spaced angular recesses 68 in its periphery at what is normally its under side, whereby an essentially triangular tooth is formed, and from the upper peripheral edge of the disk an arm 69 is upwardly projected, having a stud 70 extending at a right angle from its outer face near the top, which stud is provided with a head 71, the face of which is preferably corrugated or roughened, as shown in Fig. 8. In the bore 66 of the post a spiral or coil spring is introduced, and to the upper end of said spring a pawl 72 is secured, having vertical play in the bore, and an angular head or top capable of engaging with the respective recesses 68 in the disk 67. The post 64 is so located that the central vertical axis thereof will be in the same plane with the equivalent axis of the chuck 21, and when the arm 69 is in a vertical position (illustrated in Fig. 1) the head of the stud 70 will be immediately opposite and in horizontal alignment with the opening in the said chuck. Thus the arm 69 acts as a stop when in a vertical position and gages the length of rod to be projected from the chuck.

In operation as a stop, when the jaws of the chuck are opened and the rod is forced through them, as soon as the rod strikes the stop the said jaws are closed. The post 64 is longitudinally adjustable upon the bed 10. At the end of the machine opposite to that carrying the tubular shaft 17 side extensions 73 are secured to the bed, and upon said extensions a carriage 74 is held to slide in any approved manner longitudinally over the bed 10, as shown in Figs. 1 and 2, and upon the longitudinal carriage near its inner end a revolving turret 75 is located, adapted, preferably, to make one-sixth of a revolution at every inward thrust of the carriage. The turret-carriage is moved backward and forward by a lever-arm 76, secured at or near its center to the upper surface of the carriage near its outer end, which lever is fulcrumed at one extremity in a suitable bearing-post 77, attached to the side of the bed 10, as illustrated in Fig. 2. The movement of the carriage may be regulated in any approved manner.

The turret is adapted to carry, preferably, three horizontally-disposed die-heads 78 and reamers or screw-machine drills 79, alternately arranged, as best shown in Fig. 2. The reamers are illustrated in detail in Figs. 6 and 7, and consist of a tubular body 80, having an attached stem 81, in which body one end of a reaming-tool 82 is detachably held in any approved manner. Upon the lower surface of the reamer-body 80 a finger 83 is secured, having one curved and an opposite straight edge, which finger extends outward below and beyond the reaming-tool, parallel therewith. Upon the upper surface of the reamer-body, slightly in the direction of the curved edge of the finger 83, a trip-bar 84 is transversely and adjustably secured, as shown in Fig. 6, and the said bar at its outer end is provided with an arm 85, carried upward and outward at an inclination in direction of the longitudinal axis of the reaming-tool, and in the outer face of said arm, at its upper end, a slot 86 is formed.

The die-head 78 (illustrated in detail in Fig. 13) has been made the subject-matter of a separate application of even date herewith, and consists of spring-actuated jaws pivoted in a body 88, which jaws are permitted to open and are closed by the manipulation of a cam-ring 89, loosely mounted upon the body and held in contact with the jaws. The number of jaws employed is usually three, and in such an event three pins 90 are projected from the periphery of the ring, so spaced that when the jaws carrying the dies are closed one pin will be immediately above each jaw, and when the jaws are opened the pins will be essentially between or at one side of said jaws. The die-heads and reamers are rigidly held in the turret, the reamers being so set that the finger will be at the bottom, and the die-heads are so secured that when the jaws are closed one pin will be uppermost in a vertical position, as best illustrated in Figs. 2 and 4.

Upon the upper surface of the casing 15, surrounding the chuck 21, a tripping mechanism A is secured, adapted to be acted upon by the reamers and to act upon the die-heads, opening and closing the jaws of the same. This mechanism comprises a body portion 91, capable of rigid yet adjustable attachment to the said casing, as shown in Figs. 1, 2, and 4, a spring-actuated trip-arm 92, a pivoted locking-plate 93, and a cam-finger 94. The body portion 91 is curved upon its under face at its outer end and provided with a slot 95, through which a suitable adjusting-screw is passed into the casing 15. The inner end of the body is reduced and carried over beyond the chuck 21 at one side of the vertical center of the same, as shown in Fig. 4. The locking-plate 93 is pivoted upon the under face of the inner extremity of the body, the pivot-pin whereof is so controlled by a spring 96 that the plate, which is rectangular in general contour, will be normally held to extend at a right angle beyond the inner face of the body portion 91, as illustrated in Fig. 4. Upon the under face of the locking-plate a longitudinal diagonal shoulder 97 is formed, terminating a slight distance beyond its center, as shown in Fig. 5, and the outer end of the shoulder is carried vertically downward, forming a stop 98, having a diagonal inner face inclining in direction of the outer forward corner of the plate. The shoulder may be formed by attaching a properly-shaped auxiliary plate 99 to the pivoted locking-plate. The auxiliary plate 99, when attached, curves less than one-half the width of the pivoted plate, as shown in Fig. 5, and extends out flush with the inner end of said main plate. The pivoted plate is limited in its outward throw by contact with a recessed stop-bar 100, attached to and projecting from the inner end of the body. Upon the lower face of the pivoted plate, at its forward outer corner, the cam-finger 94 is rigidly secured, extending outwardly and downwardly in a long spiral, as illustrated in Figs. 1, 3, and 5. The lower end of the finger terminates in a beveled surface 101. The trip-arm 92 is pivoted upon the upper surface of the body 91 at its rear end, and is controlled by a strong (preferably coil) spring 102. The tripping-arm is bent downward at a right angle near its center, inside of the reduced portion of the body, and carried horizontally forward. The forward end of the arm is quite wide, and its forward edge is beveled from its outer side in direction of the body, as shown at 103 in Fig. 5, and beveled near its inner side. At its end a pin or stud 104 is projected from its upper face, adapted for contact with the enlarged section of the projecting end of the pivoted locking-plate 93 when said plate is in its normal position.

In operation the wire is fed into the revolving chuck 21 until it strikes the stop-arm 69, which arm is in a vertical position, whereupon the chuck is closed upon the wire. The turret-carriage is then fed forward and one of the reamers caused to center the chuck. As the reamer approaches the wire the finger 83 strikes the stop-arm 69 and throws the same to one side, as illustrated in Fig. 3. When the reamer has reached the wire, the arm 85 upon the top of the said reamer engages with the beveled edge 103 of the tripping-arm 92 of the tripping mechanism A (said mechanism being then as shown in Fig. 2) and presses against said edge. By the time the wire is sufficiently reduced the tripping-arm 92 is thrown outward beyond the body of the mechanism sufficiently to disengage the pin 104 from contact with the side of the shoulder of the lock-plate 93. The locking-plate being released, the spring 96 acts and throws the said plate transversely of the body, and the tripping-arm being at this moment released from the reamer the pin 104 of the tripping-arm is forced by its spring 102 in contact with the end of the lock-plate shoulder, as shown in Fig. 13. Thus the tripping-arm is held in what I designate an "open position," ready for action. The carriage 74 is then carried back and advanced again, whereupon one of the die-heads is made to face the chuck 21, the jaws being closed and one upper pin 90 in a vertical position, as shown in Fig. 4. As the last thread is cut upon the reduced end of the wire, the upper pin 90 is pressed so hard against the shoulder 97 of the plate 93 of the trip mechanism A that the said plate is forced back and the tripping-arm 92 released, whereupon the pin 104, traveling in contact with the said shoulder 97, not only retains the pivoted locking-plate in the shifted position, but also so guides the tripping-arm 92 that it, being forced violently inward by the spring 102, strikes the pin 90 of the die-head and revolves the cam-ring 89 to such an extent as to open the jaws, the movement of the pin being determined by the stop 98. The die-head is now drawn back away from the thread, whereupon the pin 90, just acted upon, is engaged with the cam-face of the spiral finger 94, and the cam-ring 89 is revolved until when the pin leaves the finger it is essentially at a right angle to the longitudinal axis of the die-head, and another pin is brought to a vertical position at the top. This movement again closes the jaws of the die-head, leaving the same in position to cut another thread. The transverse carriage 24 may now be manipulated to bring cutters to bear against the revolving threaded wire to cut the same or form shoulders thereon.

In constructing the button-shank illustrated in Fig. 9 the carriage 24 is first manipulated to bring the knives 51 and 58 to bear upon the wire, whereupon the knife 58 cuts the shoulder $a'$ adjacent to the thread, and the knife 51 the back shoulder $a^2$. The carriage 24 is now carried in a reverse direction and the knife 44 is brought in contact with the surface at the rear of the shoulder $a^2$, and the completed shank is severed from the wire. As the knife 44 is brought into operation, the horizontal arm 38 engages with the stop-arm 69 and elevates it to a vertical position to determine the forward thrust of the wire for the next shank.

I desire it to be distinctly understood that the attachments may be used in connection with any screw-cutting machine, and any one or more of the attachments described may be omitted without departing from the spirit of the invention, and also that, while specific construction has been shown and described, other equivalent construction may be employed.

Although the mechanism shown for clamping the wire to be operated upon is common to machines of this type, I have illustrated such construction in detail in Fig. 10. With reference to said figure, the inner end of the tubular shaft upon which the cone-pulley is mounted is flanged, as shown at 105, and said flange is threaded to screw upon the tubular body 106 of the chuck 21. Within the shaft 17 a tube 107 is concentrically located, which shaft is capable of turning, and the inner end of the inner tube is flanged, as shown at E, to contact with the flange of the shaft 17, and upon said flange E a series of horizontal fingers 108 is secured, having an inner tapering side. When the tube 107, through which the wire passes, is forced or carried inward, the fingers contact with jaws 109, loosely supported within the chuck-body, and lock the jaws in contact with the wire to be cut, one end of which wire projects beyond the front face of the chuck 21. When the tube 107 is carried outward, the fingers are drawn from contact with the chuck-jaws and the position of the wire may be changed. The tube 107 is manipulated by the spoked clamping-ring 19, which is fast to its outer end and exteriorly threaded to engage with an interior thread produced in a bushing 110, inserted in the standard 13.

I will now describe the mechanism employed for regulating the movement of the turret; but I desire it to be distinctly understood that I do not confine myself to such construction.

Fig. 11 is a partial section through the turret, taken on the line H', and Fig. 12 is a similar section taken on line II, both being indicated in Fig. 10.

In the under side of the table, at each side of the turret, longitudinal recesses 111 and 112 are respectively produced, and in the slide-ways below said recesses shorter recesses 113 and 114 are respectively formed, the base-wall of the latter recess being preferably provided with a depression, as shown in Fig. 12. In the recess 114 an angle-dog 115 is pivoted, adapted to engage with a toothed wheel 116, integral with the lower central portion or shank of the turret. When the turret-carriage is pushed inward, the dog is depressed and does not act upon the wheel; but when the said carriage is drawn back the dog partially revolves the wheel 116, and consequently the carriage, bringing a reamer to the front if a die-head has been in that position upon the forward or inward thrust. In order, upon the forward or inward thrust, to prevent the turret from turning, a lever 117 is pivoted at or near its center in the recess 112, as shown in Fig. 11, carrying at one end a pin 118, capable of entering any one of a series of apertures 119 in the under face of the turret, and said pin is normally held in an aperture by the bearing of a spring 120 upon the opposite end of the lever, which end is provided with a latch-head, as shown. The latch-head of the lever is capable of contacting with an angle-dog 121, pivoted in the recess 113. When the turret-table is carried forward, the dog does not act upon the lever; but upon the backward movement of the table the latch-head of the lever is raised by the dog, disengaging the pin 118 from the turret, thereby permitting the opposite dog 115 to operate. When the turret has been revolved by said dog 115, the pin 118 automatically enters one of the turret-apertures, since the latch-head will have passed the dog 121.

Having thus described my invention, I claim as new and desire to secure by Letters Patent—

1. The combination, with a wire-holding chuck and a pivoted gage pivoted in advance of the chuck, of a sliding carriage carrying a turret, and reamers horizontally projected from the turret, provided with a horizontal finger upon their under side capable of contact with the gage, substantially as shown and described.

2. The combination, with a wire-holding chuck and a pivoted gage located in front of the chuck, of a sliding carriage carrying a turret, and reamers horizontally projected from the said turret, provided with a horizontal finger secured to the under side of their body, having one curved and one straight edge, and an angle trip-bar secured upon the top of said body, and the trip mechanism A, substantially as shown and described.

3. The combination, with a wire-holding chuck, a pivoted gage located in front of the chuck, a sliding carriage, and a revoluble turret mounted upon said carriage, of reamers horizontally secured in the turret, provided with a finger horizontally attached to the under side, an angle trip-bar adjustably attached to the upper side of the reamer-body, the vertical member whereof extends beyond the front of the body and is provided with a groove in its outer surface, and the tripping mechanism A, substantially as shown and described.

4. The combination, with a wire-holding chuck, a pivoted gage located in front of the chuck, a carriage sliding in front of the gage, and a revoluble turret mounted upon said carriage, of reamers horizontally held in the turret, provided with a finger projected from their under face capable of contact with the gage, and a second carriage sliding beneath the wire-holding chuck and at the rear of the gage, and cutters adjustably held upon said carriage, all combined for operation substantially as set forth.

5. The combination, with a wire-holding chuck and the trip mechanism A, extending over and beyond the chuck, of a die-head provided with pivoted jaws, and a revolving cam-ring surrounding the jaws, having pins projected therefrom for contact with the trip mechanism, substantially as set forth.

6. The combination, with a wire-holding chuck and the trip mechanism A, of a sliding carriage, a turret mounted upon the carriage, and die-heads horizontally supported in said turret, comprising a body, jaws pivoted in the body, a loosely-mounted cam-ring inclosing and contacting with the jaws, and pins projected from the outer periphery of the ring, substantially as shown and described, and for the purpose specified.

7. The combination, with a wire-holding chuck, a gage pivoted in front of the chuck, a knife-carriage sliding below the chuck, and an arm attached to the carriage capable of setting the gage, of a reamer comprising a tubular body and a finger projected from the under surface of its body beyond its front face and capable of displacing the gage, substantially as shown and described.

8. The combination, with a wire-holding chuck, a gage pivoted in front of the chuck, a knife-carriage sliding below the chuck, and an adjustable arm projected longitudinally from one side of the carriage to set the gage, of a second carriage sliding in front of the chuck, a revoluble turret mounted upon the said second carriage, and reamers supported in the turret, comprising a tubular body and a finger having one straight and an opposite curved edge secured to the under face of the body and extending beyond its front, substantially as shown and described.

9. The combination, with a wire-holding chuck and the tripping mechanism A, located above the chuck, of a sliding carriage, a turret mounted upon the carriage, and reamers and die-heads alternately secured in the turret, the reamers comprising a tubular body and an angled trip-bar adjustably secured to the upper face of the same at its front, the die-heads comprising a body containing pivoted jaws, a loosely-mounted cam-ring surrounding and clamping the jaws, and pins projected from the said ring, all combined for operation substantially as specified.

10. The combination, with a wire-holding chuck, the tripping mechanism A, a gage pivoted in front of the chuck, a carriage sliding in front of the gage, and a turret mounted upon said carriage, of reamers and die-heads alternately arranged in said turret, the reamers comprising a tubular body, a finger projected from the bottom of the body, and an angle trip-bar adjustably secured upon the top of the same, and the die-heads consisting of a body portion provided with pivoted jaws, a loosely-mounted cam-ring clamping the jaws, and pins projected from the said ring, all combined for operation substantially as specified.

11. The combination, with a die-head comprising a body portion provided with pivoted jaws, a cam-ring loosely mounted upon the body surrounding the jaws, and pins projected from the said ring, of a tripping device comprising a body portion provided with a neck, a spring-actuated locking-plate having a shoulder 97 upon its under side and pivoted to the neck, a spiral cam-finger projected from the said locking-plate, and a spring-actuated angle tripping-arm provided with a pin projecting from its upper surface near its outer edge, substantially as shown and described.

JOHN N. SEVERANCE.

Witnesses:
R. S. BARROWS,
WILLIAM J. MILLER.